United States Patent
Jellinek

(10) Patent No.: US 9,363,348 B2
(45) Date of Patent: Jun. 7, 2016

(54) DEVICE AND PROCESS FOR CUSTOMIZING A HEADSET OR OTHER AUDIO DEVICE

(75) Inventor: Herbert Jellinek, Aptos, CA (US)

(73) Assignee: Plantronics, Inc., Santa Cruz, CA (US)

(*) Notice: Subject to any disclaimer, the term of this patent is extended or adjusted under 35 U.S.C. 154(b) by 1009 days.

(21) Appl. No.: 12/903,778

(22) Filed: Oct. 13, 2010

(65) Prior Publication Data

US 2012/0096111 A1    Apr. 19, 2012

(51) Int. Cl.

| G06F 15/16 | (2006.01) |
| G06F 15/177 | (2006.01) |
| H04M 1/60 | (2006.01) |
| H04M 1/725 | (2006.01) |

(52) U.S. Cl.
CPC ........ *H04M 1/6066* (2013.01); *H04M 1/72525* (2013.01)

(58) Field of Classification Search
CPC .................. H04M 1/6066; H04M 1/72525
USPC .......... 709/202, 217, 219, 220, 228, 246, 245
See application file for complete search history.

(56) References Cited

U.S. PATENT DOCUMENTS

| 6,671,522 | B1* | 12/2003 | Beaudou ................ H04L 29/06 455/418 |
| 6,850,775 | B1 | 2/2005 | Berg |
| 7,283,635 | B1 | 10/2007 | Anderson |
| 7,477,922 | B2* | 1/2009 | Lewis ........................ 455/569.1 |
| 7,676,248 | B2 | 3/2010 | Reuss |
| 7,738,434 | B1 | 6/2010 | Reuss et al. |
| 7,912,020 | B2* | 3/2011 | Khasawneh et al. .......... 370/338 |
| 8,073,152 | B1 | 12/2011 | Reuss |
| 8,086,781 | B2* | 12/2011 | Ananny et al. ................ 710/315 |
| 8,341,318 | B2* | 12/2012 | Holden et al. .................. 710/72 |
| 8,452,347 | B2* | 5/2013 | Rahman et al. ............ 455/569.1 |
| 2003/0220988 | A1* | 11/2003 | Hymel ......................... 709/220 |
| 2004/0034624 | A1* | 2/2004 | Deh-Lee et al. .................. 707/3 |
| 2005/0136909 | A1* | 6/2005 | Eguchi ......................... 455/420 |
| 2005/0283263 | A1* | 12/2005 | Eaton et al. .................... 700/94 |
| 2006/0046651 | A1 | 3/2006 | Hazel et al. |
| 2006/0156415 | A1* | 7/2006 | Rubinstein et al. ............. 726/27 |
| 2007/0014409 | A1* | 1/2007 | Batra et al. .................... 380/270 |
| 2007/0099568 | A1* | 5/2007 | Yang et al. .................... 455/41.2 |
| 2009/0013063 | A1* | 1/2009 | Soman .......................... 709/223 |
| 2009/0198930 | A1* | 8/2009 | Johnson ............. G06F 11/1456 711/162 |
| 2009/0300024 | A1* | 12/2009 | Schneider ...................... 707/10 |

(Continued)

FOREIGN PATENT DOCUMENTS

WO    0154458    A2    7/2001

OTHER PUBLICATIONS

EPO. Written Opinion of the International Searching Authority for PCT/US2011/044709. Mail Date: Sep. 22, 2011.
EPO. International Search Report for PCT/US2011/044709. Mail Date: Sep. 22, 2011.
Jini. wikipedia.com. http://en.wikipedia.org/wiki/Jini. Accessed on Sep. 17, 2010.

(Continued)

*Primary Examiner* — Madhu Woolcock
(74) *Attorney, Agent, or Firm* — Thomas L. Ewing

(57) ABSTRACT

A system and method are described that enable a headset and a communications device to improve their interoperability. The headset signals its identity to the communications device that in turns uses a communications network to locate additional data and/or updated data regarding the audio device and/or its interoperability with the communications device. The system and method may enable post-manufacturing enhancements for audio devices, such as headsets.

36 Claims, 5 Drawing Sheets

(56) References Cited

U.S. PATENT DOCUMENTS

2010/0042826 A1* 2/2010 Bull et al. .................... 713/100
2010/0153709 A1* 6/2010 Thomas et al. .............. 713/155

OTHER PUBLICATIONS

Main Page. jini.org. http://www.jini.org/wiki/Main_page. Accessed on Sep. 17, 2010. Page modified on Mar. 8, 2007.

* cited by examiner

DEVICE AND PROCESS FOR CUSTOMIZING A HEADSET OR OTHER AUDIO DEVICE

FIELD

Embodiments of the invention relate to systems and methods for communications among the devices in a network. More particularly, embodiments of the invention relate to mobile phones, personal computers, wireless headsets, communications and communications protocols between such devices and post-manufacturing processes for updating and customizing the operations between such devices.

BACKGROUND

Unified communications represents an important component of productivity in contemporary business culture, and its success from company to company can serve as a bellwether indicator of the company's overall management success. An essential feature behind unified communications is the ability to have a single way for reaching an employee. Thus, in a fully configured unified communications environment, all messages to an employee, regardless of the format of their origin (e.g., e-mail) will reach the employee at the earliest possible moment via another format (e.g., SMS) if necessary.

One crucial backbone for unified communications arises from the ability to customize user experiences across all user groups. Another key backbone for unified communications is the ease with which users may utilize the functions and features of their communications equipment and systems.

Apart from the unified communications paradigm that has become so important in business culture, considerations such as customization and enhanced maintenance and maintainability also predominate in conventional consumer applications of communications technologies.

One aspect behind the ease of customers, both business and consumer customers, to utilize the full extent of their communications equipment arises from the ability to customize inter-operating devices to each other. So, for example, customizing a headset for maximum application with a given mobile telephone handset. Of course, this problem does not limit itself to mobile telephones alone and includes a larger class of devices that may connect to a wireless headset, including but not limited to personal computers.

To further support their products in achieving these aims, headset manufacturers often desire to provide extra features to users beyond those that shipped with the headset. Unfortunately, in many instances, the process for customizing a given headset for operation with any number of possible communication devices has proven too daunting and/or too resource intensive for manufacturers.

For example, it is typically not practical to include in a headset's firmware information about all the possible devices to which the headset might possibly be connected in order to customize the connection between the headset and each one of those given devices should such a connection occur. Of course, some headsets may be customizable for a given customer (e.g., a mobile carrier), but this solution is typically possible only because the varieties of mobile telephones offered by any given mobile carrier tend to be finite. Providing extra features for a theoretically unlimited set of headsets connected to a theoretically unlimited set of communications devices is a significantly more complicated problem.

Even a matter as seemingly simple as providing a customized headset icon for a mobile phone's device display can become a complicated logistical effort. One possible solution requires the headset somehow to transmit an image to the mobile handset when it connects, but there are numerous technical problems involved in this. Images tend to be large, requiring large amounts of memory in the headset, and there is some cost in transmitting the image from the headset to the phone. If the headset stored the icon, then it might well need a warehouse of icons in a variety of sizes plus logic for determining which icon was the appropriate one for a given communication device's display. In addition, the headset would need to have a common communication mechanism with the communication device in order to download the icon. Headsets do not conventionally come with much internal storage or the ability to carry out much complex logic. While headsets and handsets do communicate voice and some command information, the ability to conduct non-standard communications is often severely constrained.

Headsets could be sold with memory devices, such as CDs, but doing this would increase the cost of the headset. In addition, if the CDs were stored for any length of time, then new models of mobile phones would likely be released for which the CD contained no information. Furthermore, many customers do not like having to explicitly customize their headsets to work with a given communication device. For example, if the headset shipped with a CD, then for many communication devices, the user would still need to tether the communication device to a personal computer in order to read the CD so that it could instruct the handset in how to personalize the headset's display on the handset's device display. Many users might consider this solution to be more of a headache than a help.

The interoperability problems described above extend far beyond the display of simple icons representing a given headset. More significantly, the interoperability problem also pertains to the installation of new and updated drivers and new and updated application software.

More significantly with software and drivers than with the selection of an icon, there is always the risk the user will install the wrong driver or the wrong application—or that the user will never install either one. Users may find the process too complex and too cumbersome and simply never attempt anything at all.

Even worse, because of the danger of making the user's experience difficult and complex, tarnishing the manufacturer's products, some manufacturers foreswear the improvement of their fielded products and simply make no or few efforts to improve their fielded product base. In short, once these products have left the factory, they are considered complete and never updated.

As discussed above, attempts to solve this problem in the prior art have tended to be either overly complicated, overly expensive, or both. The provision of additional capabilities in the headsets for customization has generally not been considered an economically viable solution, and this solution is also not easily amenable to post-manufacturing updates. While provisioning the headset with a separate CD may be somewhat more economical, this solution can be fairly cumbersome and is also not readily amendable to post-manufacturing updates. Thus, while these solutions are somewhat workable, they produce far from the desired results and cannot possibly be considered robust.

Other solutions have proven equally inadequate or inappropriate. A simple and robust solution is called for in order to make unified communications more successful and ubiquitous, and to improve the interoperability and customization available in consumer devices.

SUMMARY OF THE INVENTION

Embodiments of the invention provide a method for obtaining device data from a remote data repository. An audio device, such as a headset, sends device identification information to a communication device, such as a mobile telephone, wherein the device identification information provides an identity for the audio device. The device identification information is received on the communication device and re-formatted by the communication device into an address having a format suitable for transmission over a communication network, such as the Internet, to a remote data repository. The address is transmitted over the communications network to the remote data repository, which has been configured to use the address to locate device data and return the device data to the communication device. The device data is received from the data repository by the communication device, and applied to operations between the audio device and the communications device.

Embodiments of the invention also provide a system for obtaining device data from a remote data repository. A configuration unit on an audio device is configured to send device identification information about the audio device to a communication device, wherein the device identification information provides an identity for the audio device. A command processor on the communication device is configured to receive the device identification information sent by the configuration unit, and the communication device is configured to re-format the received device identification information into an address having a format suitable for transmission over a communication network to a remote data repository. An update unit is configured to transmit the address over the communications network to the remote data repository, which has been configured to use the address to locate device data and return the device data to the communication device. The communication device receives the device data from the data repository, wherein the communication device applies the received device data to operations between the audio device and the communications device.

Embodiments of the invention further provide a system for obtaining device data from a remote data repository. A configuration unit on an audio device, such as a headset, is configured to re-format device identification information about the audio device into an address having a format suitable for transmission over a communication network and is further configured to send the address to a communication device. An update unit on the communication device is configured to receive the address sent by the configuration unit and transmit the address over a communication network to the remote data repository, which has been configured to use the address to locate device data related to the audio device and return the device data to the communication device. The configuration unit has been further configured to receive device data sent by the remote data repository and apply the device data to operations between the audio device and the communications device.

Embodiments of the invention further provide a method for obtaining device data from a remote data repository. A configuration unit on an audio device formats device identification information about the audio device into an address having a format suitable for transmission over a communication network. The configuration unit sends the address to a communication device. An update unit on the communication device receives the address sent by the configuration unit and transmits the address over a communication network to the remote data repository, which has been configured to use the address to locate device data related to the audio device and return the device data to the communication device. The configuration unit receives device data sent by the remote data repository. The device data is applied to operations between the audio device and the communications device.

DETAILED DESCRIPTION OF AN EMBODIMENT OF THE INVENTION

Figure 1:
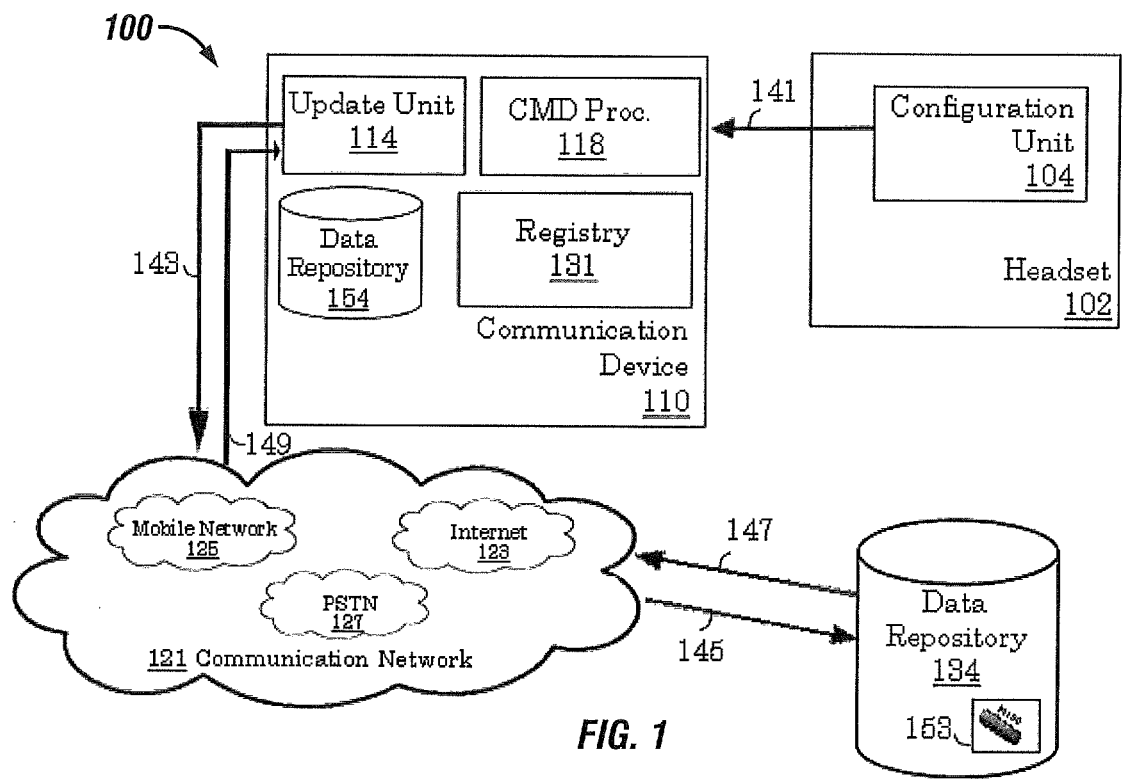
FIG. 1 illustrates a system 100 configured to carry out a customization procedure between a headset 102 and a communication device 110, such as a mobile phone, according to an embodiment of the invention.

Embodiments of the invention provide a system and a method for automatically downloading and installing headset-specific software, media, and/or other data via a network-connectable communication device, such as a mobile phone, personal computer, or other mobile device, as directed by headset-supplied information, such as user-agent strings. In some embodiments of the invention, a Bluetooth-enabled headset device may transmit software, installation directions, and/or instructions to a host network-connectable communications device.

Conventional communications protocols used between headsets and communications devices tend to support communications only on fairly narrow terms. Bluetooth specifications, for example, define a "lowest common denominator" set of requests and responses that may be exchanged between an audio device (e.g., headset) and host communication device (e.g., mobile phone). This defined set of requests and responses limits the set of operations the audio device may perform, which in turn leads to the commoditization of these audio devices. In other words, if one creates an audio device with new features, the official Bluetooth protocols alone cannot support these new features. Moreover, the software on the host device often cannot be easily changed to accommodate new Bluetooth features.

Since many communication devices (e.g., mobile phones) can connect (e.g., via the Internet) to remote data sources, there exists a robust and likely cheaper way of personalizing and updating certain headset features. So, for example, in the case of providing a headset icon to a mobile phone, rather than transmitting an image of itself to the communication device, a headset could instead send an identifier (e.g., a "user-agent string") that names the manufacturer and headset model. Thus, a Plantronics M100 headset might send the identifier over its communications link (e.g., an Asynchronous Connectionless Link (ACL) link) to the communication device. ACL represents one of two types of data links defined for Bluetooth systems. ACL provides an asynchronous (packet-switched) connection between two devices created on the Link Management Protocol (LMP) level. ACL links are primarily used to transmit ACL packet data. Here, an AT (or "attention") command could be employed to send the identifier from the headset to the communication device by employing a command having form such as:

AT+HSET=COM.PLANTRONICS,M100-XYZ

This command can be interpreted as meaning: "This is a Plantronics M100 version XYZ headset."

Embodiments of the present invention rely upon the headset and perhaps a communications device (e.g., a mobile phone) to describe themselves to a remote data source (e.g., a website) such that the remote data source can respond accurately and appropriately with updated and/or enhanced data for the headset and/or communications device. Some Bluetooth devices can provide a "Friendly Name" upon request, but this technique cannot typically be guaranteed to be unique or precise.

Headsets generally share the characteristics of being small, personal, inexpensive, disposable, low power, wireless networked client devices. Headsets typically have limited abilities for taking actions on their own and tend to have only a few available communications channels. The communications channels tend to be confined to standardized communications, thus limiting the ease with which a manufacturer can customize the devices, as discussed above.

In order to update itself and/or its relationship with a communication device, a conventional headset would typically need to trigger the update connection itself. Because of the manner in which headsets are conventionally designed, as discussed above, the connection would typically need to be automatic and asynchronous in order to send information to a host communication device that would trigger an update connection.

On the first connection, the headset might indicate that it is an earlier version (e.g., version 3) than the one (e.g., version 5) presently being sold or distributed by the manufacturer. In many instances, it might be possible for the version 3 headset to support some (or all) of the software features found in the version 5 model. In addition, the version 5 model's software may correct deficiencies found in the version 3 model as shipped.

Embodiments of the invention may enable tighter integration between audio devices (ag., headsets) and communications devices (e.g., mobile phones), enabling an improved user experience. Conventional communication device and headset combinations do not typically allow the communication device to access the Internet for the purpose of downloading and installing auxiliary information relating to the headset, especially not in situations where the headset has only recently become associated with the communication device. Likewise, conventional communication device and audio combinations do not typically allow the communication device to use the Internet to download and install software applications extending or customizing the headset and/or its user interface. Embodiments of the invention can theoretically incorporate large variations in program logic, static or dynamic visual imagery, and rich interaction between the headset and the communication device. Embodiments of the invention may also assist in providing technical customer support, in both simple ways (e.g., a link to an online support website) and sophisticated ways (e.g., allowing the downloading and installation of new headset firmware).

Embodiments of the invention may allow the communication device to tune various parameters (e.g., audio parameters) based on the special characteristics of the headset. This technique may enable a headset to extend its user interface onto a mobile phone, for example, and give the mobile phone/headset combination capabilities that extend and exceed the capabilities which either device possessed at the time of its manufacture and distribution.

Embodiments of the invention may allow the headset to, in effect, modify the host communication device, and create new types of headset-host interactions. Such embodiments may extend an audio device's user interface to the host communication device, and further enable the creation of new product features that provide a richer user experience. Headset products, even many already fielded may be customized in ways hitherto unavailable, according to embodiments of the invention.

FIG. 1 illustrates a system 100 configured to carry out a customization procedure between a headset 102 and a communication device 110, such as a mobile phone, according to an embodiment of the invention. The headset 102 could comprise another type of audio device, according to an embodiment of the invention.

A configuration unit 104 within the headset 102 sends a command (e.g., the AT command discussed above) to the communication device 110 via a communication link 141 between the communication device 110 and the headset 102. The communication link 141 may be an ACL link, as discussed above. The configuration unit 104 could comprise a small piece of memory configured to transmit the command over the communication link 141 whenever the headset 102 is initially connected to the communication device 110. The configuration unit 104 could comprise memory types such as ROM, Flash, RAM or EPROM, according to embodiments of the invention. Of course, there are different costs associated with each of these memory choices that could be factored into the development of the configuration unit 104 so as to render the headset 102 more commercially viable. At various times, one of these memory device options may be more cost attractive than it is at other times. In addition, the configuration unit 104 could comprise a portion of another headset component, according to an embodiment of the invention.

Upon receiving the command over the link 141, a command processor 118 in the communications device 110 may look up "COM.PLANTRONICS" in a registry 131 of headset manufacturers stored on the communication device 110. The registry 131 may be located in firmware within the communication device 110, according to an embodiment of the invention. The registry 131 may even be included in a data repository 154, according to an embodiment of the invention.

The convention employed in this sample command ("COM.PLANTRONICS") is simply the Plantronics corporate Internet domain, reversed. The registry 131 could also contain the identities of other peripheral device suppliers, according to an embodiment of the invention. Corporate website addresses tend to be fairly stable and do not often change. Accordingly, the addresses stored in the registry 131 would likely be viable for a number of years, if not for the active lifetime of the communication device 110.

A manufacturer, a group of manufacturers, or some other organization, could also agree upon a single website that could contain databases for a variety of products, with the website's address designed for long duration (e.g., virtual permanence). The name could also be looked up in table built into the device firmware (e.g., the registry 131), allowing a name to refer to other than the reversed domain name, according to an embodiment of the invention. For example, the table could contain an entry that maps the identifier ORG.OPEN-HEADSET to the domain openheadset.plantronics.com. It could also specify some other transformation of the identifier into a fully-qualified host name (FQHN).

The registry 131 could also be used to store other manufacturer identifies. For example, assume that the communication device 110 did not have an Internet connection but did have modem functionality. In such an embodiment, then the registry 131 could contain a telephone number for a location where additional data could be obtained.

Assume that the communication device 110 comprises a Nokia 5800 mobile phone. In this instance, the "COM.PLANTRONICS" entry in the registry 131 instructs an update unit 114 to configure a command such as:
   plantronics.com/
      getheadseticon?model=X&phone=Nokia5800

This command can then be employed to provide updated and/or enhanced headset features for operation of the headset 102 on the communication device 110. The update unit 114 sends this command over a communication network 121 in order to reach a data repository 134 that contains updated/enhanced data 153.

The communication network 121 may comprise a variety of networks, such as a mobile telephony network 125, a public switched telephone network 127, and an Internet 123. In the example provided here, the update unit 114 uses the Internet 123 to retrieve the data 153 via a website (not shown) that includes the data repository 153, according to an embodiment of the invention. Of course, other configurations of the communications network 121 may be employed in order to retrieve the data 153 from the data repository 134. The general techniques for enabling a website to provide accessible data to third parties are well known in the art and need not be further described here.

In some embodiments, the update unit 114 on the communication device 110 may query a user of the communication device 110 to obtain permission to retrieve and store the data 153 in the data repository 154 on the communication device 110. In other embodiments, the update unit 114 may simply complete its tasks without the necessity for user intervention and/or authorization. The update unit 114 may comprise a dedicated subsystem within the communication device 110 or it may comprise a small portion of a larger system within the communication device 110. For example, the update unit 114 might comprise a small program (e.g., an applet) that interacts with a general purpose browser program installed on the communication device 110. To summarize the above discussion, the command processor 118 receives a command such as "AT+HSET=COM.PLANTRONICS,M100-XYZ," and uses this command to look up "COM.PLANTRONICS" in the register 131 which determines that the manufacturer is the Plantronics Corporation, and then the update unit 114 takes this information to configure the Internet address: http://www.plantronics.com/getheadseticon?model=M100-XYZ," which the update unit 114 then provides to a web browser, according to an embodiment of the invention. Developing a small program (e.g., and applet) or am equivalent in hardware is well with the skills of an ordinary artisan.

The update unit 114 typically stores the data 153 in a data repository 154 on the communication device 110. The data repository 154 may be a general purpose data repository on the communication device 110. In subsequent connections between the headset 102 and the communication device 110, the communication device 110 may access the data 153 by simply retrieving the data 153 from local storage in the data repository 154 rather than making a connection with the distant data repository 134. The data 153 and/or the update unit 114 may be configured to periodically check the data repository 134 for an update to the data 153, according to an embodiment of the invention.

Figure 2:
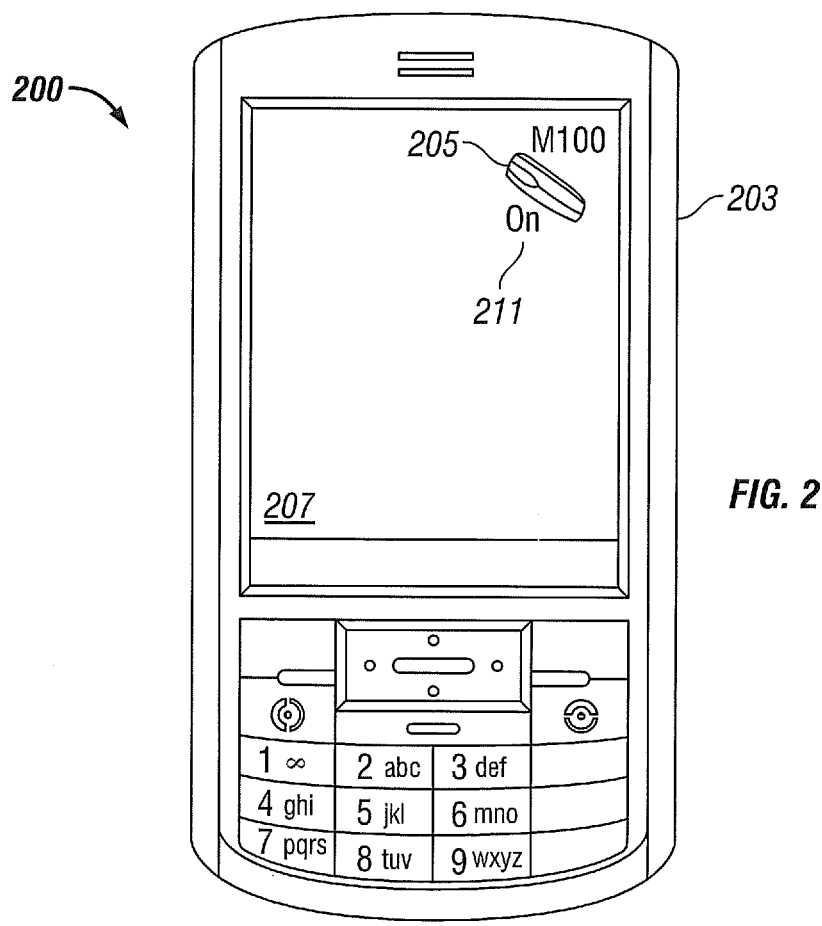
FIG. 2 illustrates a system 200 in which a communication device 203 has retrieved the data 153 shown in FIG. 1, according to an embodiment of the invention.

FIG. 2 illustrates a system 200 in which a communication device 203 has retrieved the data 153 shown in FIG. 1, according to an embodiment of the invention. In this example, the data 153 comprises an icon 205 for the model M100 headset shown on a device display 207. A small program 211 associated with the data 153 displays the headset status (e.g., "on" or "off"), according to an embodiment of the invention. As discussed above, the data 153 could comprise a variety of enhanced and updated data and is not necessarily limited to headset icons, such as the icon 205.

The registry 131 shown in FIG. 1 would likely be fixed when the communication device 110 left its manufacturing plant, according to an embodiment of the invention. Of course, it would be possible to update the registry 131 after it had had been manufactured, according to an embodiment of the invention, but such an updating process might be practically cumbersome and require too much coordination among independent parties. Accordingly, alternative embodiments of the invention comprise further approaches for adding enhanced/updated data for a headset.

Figure 3:
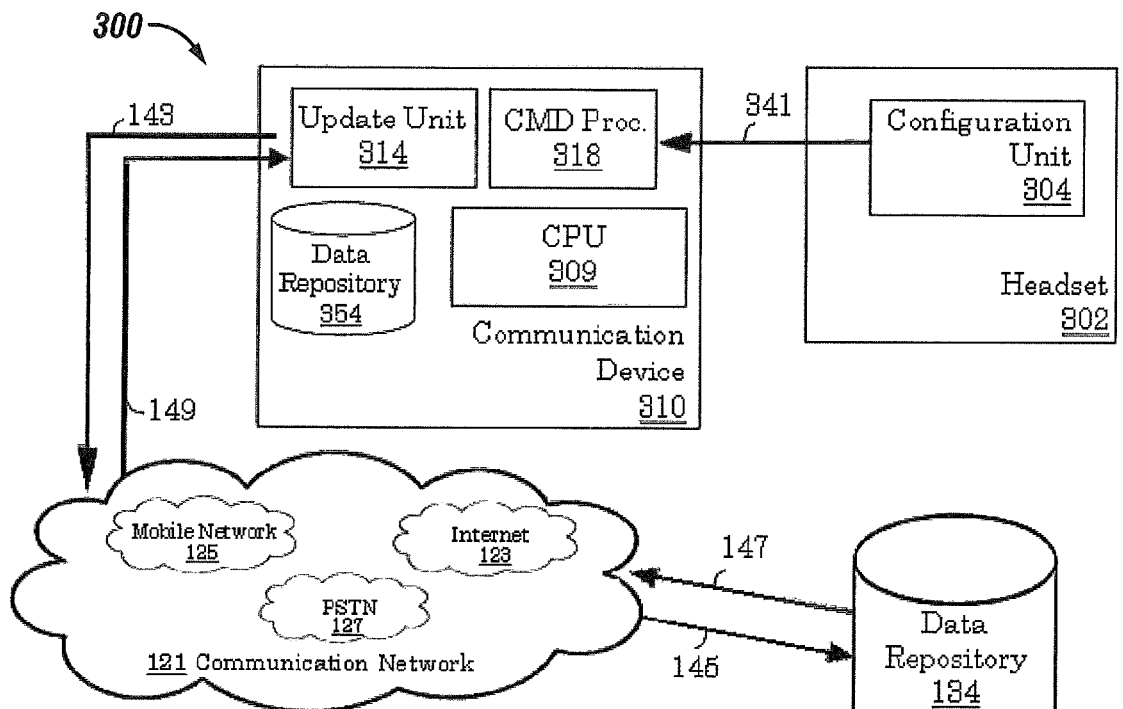
FIG. 3 illustrates a system 300 in which a command processor 318 forwards a command (e.g., an AT command) received via a link 341 from a headset 302 to a central processing unit (CPU) 309 associated with a communication device 310, according to an embodiment of the invention.

FIG. 3 illustrates a system 300 in which a command processor 318 forwards a command (e.g., an AT command) received via the link 341 from a headset 302 to a central processing unit (CPU) 309 associated with a communication device 310, according to an embodiment of the invention.

The CPU 309 computes an address for the data repository 134. The address computation performed by the CPU 309 comprises an address that the communication device 310 could use to find and retrieve data 305. For example, the CPU 309 may compute a uniform resource locator (URL) from the command received along link 341. The CPU 309 might reverse the manufacturer's identifier to produce an Internet domain name (CON. PLANTRONICS, in this example, becomes PLANTRONICS.COM) and add some parameterized boilerplate text to produce the requisite URL for retrieving updated/enhanced data 305. For example, the additional information might be:
   "/getheadseticon?model=<headset
      model>&phone=<phone model>",
where "headset model" and "phone model" are parameters. Assume, for example, that the headset model was the "Voyager Pro," version XYZ, and the phone model was the "Nokia 5800." In this example, the CPU 309 would produce the URL:
   http://plantronics.com/getheadseticon?model.VOY-
      AGER-PRO-XYZ&phone-Nokia5800

The address (or URL as shown above), could have the format of a hypertext transfer protocol address (e.g., "http:// . . . ), according to an embodiment of the invention. Alternatively, the address could have another format, such as the file transfer protocol ("FTP"). The address scheme is preferably suitable for finding data in a data repository located across a distant network, according to an embodiment of the invention.

The update unit 314 would then use this URL to connect over the Internet 123 to the appropriate Internet website which would access the data repository 134 in order to download the data 305. In this example, the server associated with the data repository 134 would interpret the model (e.g., Voyager Pro version XYZ" and phone parameter values (e.g., Nokia 5800) to determine the correct icon(s) to provide the data 305.

The data 305 could comprise a variety of subsidiary data packages, and the update unit 314 could be configured to request a specific subsidiary package or all available packages. For example, assume that the data 305 was associated with icons of the headset 102 at various screen resolutions, pixel depths, orientations, etc. The update unit 314 could request a set of icons for different screen resolutions, pixel depths, orientations (landscape/portrait), or other parameters that together form the data 305. In a further embodiment of the invention, rather than assuming that the headset's website (here, plantronics.com) knows what sort of images the Nokia5800 phone expects, the update unit 314 could be configured to convey the communication device's requirements to the website such that the data repository 134 might only send back a fraction of the information that it would otherwise send. For example, the update unit 314 could configure the URL sent to the data repository 134 as:

http://plantronics.com/
    getheadseticon?model=VOYAGER-PRO-
    XYZ&iconmaxheight=28pixels&iconmaxwidth=
    28pixels&pixeldepth=16

This command could be interpreted by the data repository 134 as asking for an icon that was 28 pixels high, 28 pixels wide, and 28 pixels in depth, according to an embodiment of the invention. Alternatively, the data repository 134 might interpret this command as a request to send an icon that was no bigger than 28 pixels high, 28 pixels wide, and 28 pixels in depth, and then the data repository 134 would send over the link 147 any icons that satisfied these criteria, according to an embodiment of the invention.

Of course, the update unit 314 could be differently configured for operation with the communication network 121, according to an embodiment of the invention. For example, the update unit 314 could be configured to connect to the data repository 134 via the PSTN 127. This approach might be helpful in situations where the communication device 310 does not have an Internet connection but does have a modem or modem-like connection.

Figure 4:
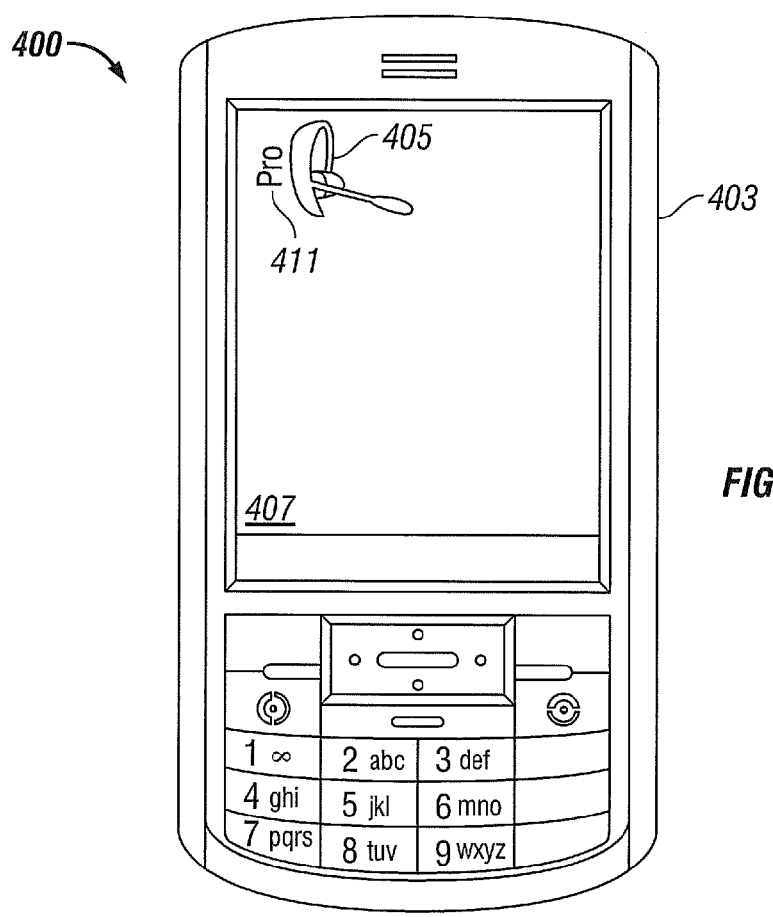
FIG. 4 illustrates a system 400 in which a mobile phone 403 has received the data 305 shown in FIG. 3 that comprises a headset icon 405, according to an embodiment of the invention.

FIG. 4 illustrates a system 400 in which a mobile phone 403 has received the data 305 shown in FIG. 3 that comprises a headset icon 405, according to an embodiment of the invention. Also shown on a device display 407 along with the headset icon 405 is a status indicator 411 that could include a small user accessible program function. Alternatively, the status indicator 411 could operate autonomously, e.g., the status indicator 411 could be configured to display available battery power. For example, as battery power becomes diminished, the word "Pro" could change from solid to hollow and/or from one color to another, according to an embodiment of the invention. In an embodiment of the invention, the update unit 314 simply downloads the icon 405 and not the status indicator 411.

Embodiments of the invention may provide more general applications beyond obtaining individual or multiple icons for on-screen display, such as the icon 405 on the mobile phone 403 shown in FIG. 4. These general applications may pertain to enhancements of the communication device and/or the headset, and/or the combination of the two devices.

Figure 5:
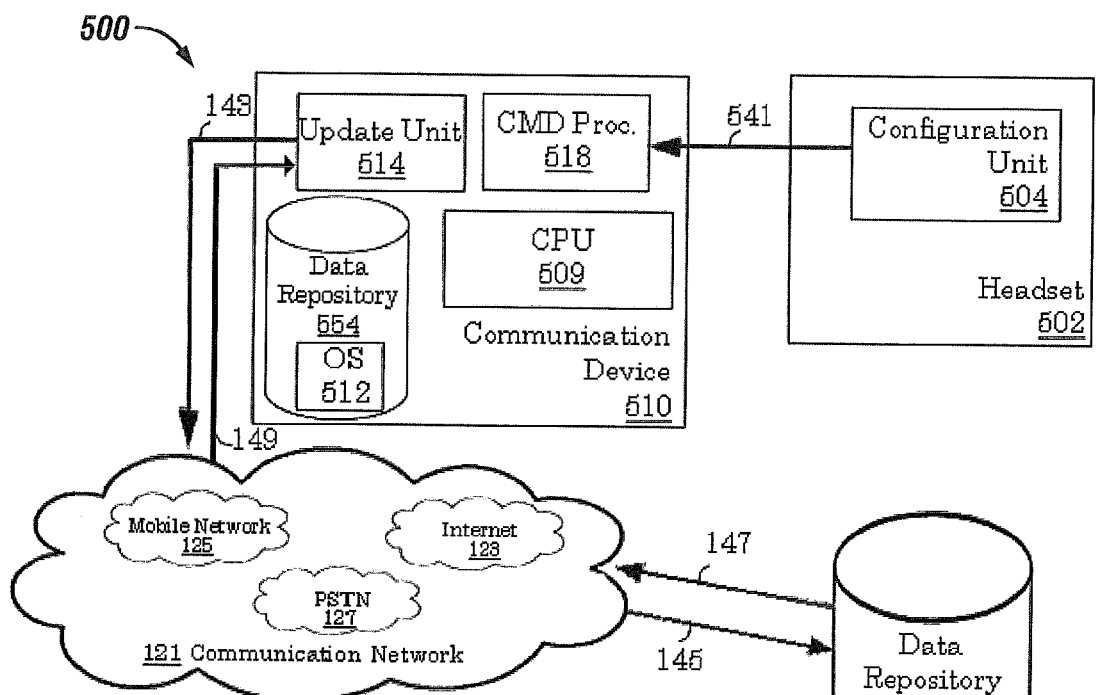
FIG. 5 illustrates a system 500 in which a headset 502 coordinates with a communication device 510 to provide at least one new software application 505 on the communication device 510, according to an embodiment of the invention.

FIG. 5 illustrates a system 500 in which a headset 502 coordinates with a communication device 510 to provide at least one software application 505 to the communication device 510, according to an embodiment of the invention.

Assume that the communication device 510 has an operating system 512 that permits the installation of new software applications, such as ones retrievable via the communication network 121 including the Internet 123. Many conventional models of mobile phones, for example, include operating systems that allow the user to download new software applications over the Internet. The software applications downloaded in the system 500 (e.g., "headset phone applications) could provide features specific to the headset 502 and/or its interaction with the communication device 510, according to an embodiment of the invention. Of course, embodiments of the invention may require the user's permission in order for these downloads to occur or they may operate autonomously, as previously discussed.

The communication device 510 could obtain the data 305 following the procedure described in FIG. 3, according to an embodiment of the invention. As part of the process of obtaining the data 305, the data repository 134 could make the communication device 510 aware that additional data (e.g., the application 505) was also available for download and provide appropriate identification information. Of course, the communication device 510 need not download the data 305 in order to obtain the application 505, and the communication device 510 may seek out the application 505 irrespective of the availability of the data 305, according to various embodiments of the invention.

The CPU 509 could compute the appropriate URL as:
http://plantronics.com/
    getheadsetapp?model=VOYAGER-PRO-
    XYZ&phoneOStype=Android7&phoneMfg=
    HTC&phoneModel=mytouch The information contained in this URL tells the data repository 134 that the headset is a Voyager Pro headset version XYZ, that the operation system 512 is an Android7 system, and that the communication device 510 is an HTC my touch mobile telephone. Of course, this URL could be computed without having first received any information from the data repository 134. Information returned from the data repository 134 could provide a menu of different programs that could be downloaded to the communication device 510 for later selection regarding programs that could be retrieved. In such cases, the URL above could be further refined to specify an identity for the desired program. The menu could be obtained by one or more queries (or polls) of the data repository 134, according to an embodiment of the invention.

The update unit 514 could then use this URL to access data 505 in the data repository 134 via the Internet 123. By specifying the identity of the headset 502, the operating system 512, and the communication device 510, then the data repository 134 can make sure to provide as the application 505 a properly configured application for the specified headset, operating system, and communication device. Once the update unit 514 had retrieved the data 505, the data 505 could be installed in the communication 510 so as to be suitable for use with the headset 502, the communication device 510, and the operating system 512.

A software application associated with the data 505 could perform a number of functions related to the headset 502. For example, the application could display the headset battery charge level; allow the user to program quick-dial entries in the headset's internal phone directory; let the user manipulate audio parameters; provide other customization/personalization features; check for headset firmware updates; provide a link to the manufacturer's website; check for updates to the headset phone app itself; and provide the means to purchase aftermarket headset accessories or software, perhaps for additional cost.

Figure 6:
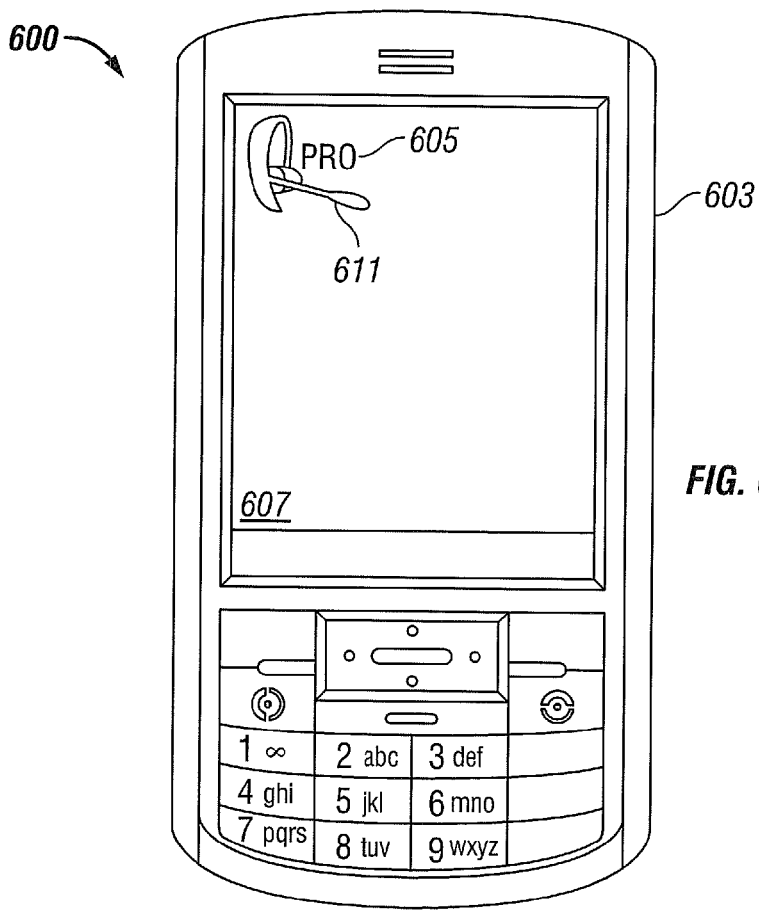
FIG. 6 illustrates a phone system 600 having an icon 611 associated with the headset 502 shown in FIG. 5 and an icon 605 associated with a software application downloaded via the data 505 shown in FIG. 5, according to an embodiment of the invention.

FIG. 6 illustrates a phone system 600 having an icon 611 associated with the headset 502 shown in FIG. 5 and an icon 605 associated with a software application downloaded via the data 505, according to an embodiment of the invention. The icon 605 could take numerous forms, and not all applications necessarily require user-accessible icons. In the example shown in FIG. 6, the icon 605 shown on a device display 607 provides a user-selectable entry point to a software application. As mentioned, the icon 605 may take numerous forms, but as shown in FIG. 6, the icon 605 mirrors the icon 411 shown in FIG. 4 albeit with a slightly different location and appearance.

Figure 7:
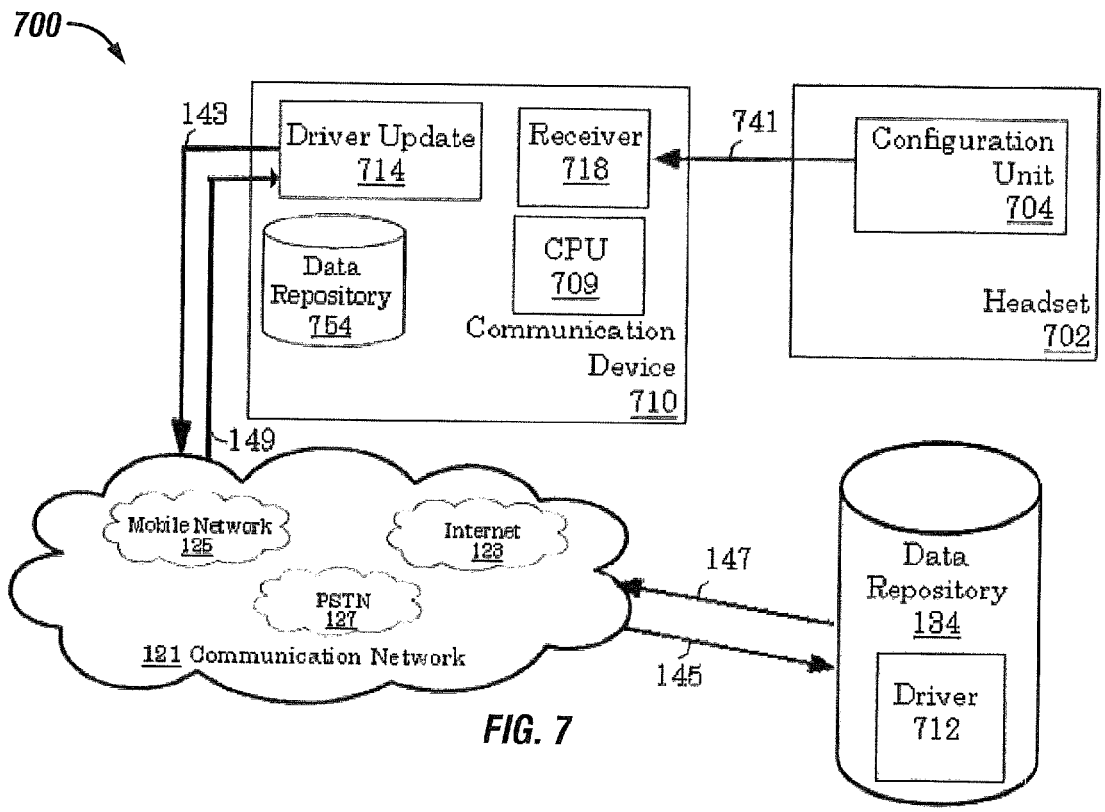
FIG. 7 illustrates a system 700 having enhanced capabilities for updating a headset 702 via improvements made to a communication device 710, according to an embodiment of the invention.

FIG. 7 illustrates a system 700 having enhanced capabilities for updating a headset 702 via improvements made to a communication device 710, according to an embodiment of the invention. Embodiments of the invention may provide an audio device (in this example, the headset 702) that contains its own device driver and/or application software and transmits that software to a host device, such as the communication device 710.

Commercial sales of the headset 702 could include drivers for all operating systems and/or a majority of operating systems. However, this might likely increase the cost/complexity of the headset 702 beyond commercially appropriate levels. Similarly, providing the drivers via a separate physical channel (e.g., CD, memory stick, etc.) might also incur commercially prohibitive expenses. Accordingly, embodiments of the invention include an ability to assist the headset 702 and the communication device 710 in locating an appropriate driver for the headset 702 when used in combination with the communication device 710.

The headset 702 communicates its identity over connection 741 to a receiver 718, according to an embodiment of the invention. The configuration unit 704 could communicate the identity of the headset 702 using an approach such as the AT Command discussed in conjunction with FIGS. 1, 3, and 5, according to an embodiment of the invention. The communication device 710 could take the information received via the connection 741 and use it to find an appropriate device driver 712 via the communications network 121 on the data repository 134 in the manner discussed above for retrieving icons and small software applications.

The configuration unit 704 could provide the receiver 718 with an AT command that is processed in one of the ways discussed above in conjunction with FIGS. 1, 3, and 5 in order to arrive at an address (e.g., a URL) where the driver can be obtained. Alternatively, the configuration unit 704 could be configured to directly supply the appropriate URL to the receiver 718 which could then be directly applied by the communication device 710 over the internet 123 to find the driver 712. This approach would likely require some additional adjustments on the communication device 710 that might possibly make this approach less attractive for implementation by some communication device manufacturers.

In another alternative embodiment, the configuration unit 704 could employ an appropriate Bluetooth protocol to instruct a user of the communication device 710 in how to find the driver 712. For example, if the communication device 710 implemented the Bluetooth Human Interface Device (HID) protocol, then the configuration unit 704 could provide instructions via the link 741 that would essentially "type" the URL for the user in a manner resembling that of a Bluetooth keyboard. Once the URL had been typed, then the driver update 714 could retrieve the driver 712 from the data repository 134 via the Internet 123.

In yet another alternative embodiment, the configuration unit 704 could provide instructions over the link 741 that caused the receiver 718 to engage the opening of am audio channel that played the URL assembly instructions for finding the driver 712 to the user of the communication device 710. The resulting combination could outline the steps to be followed, e.g., "Open your Web browser and type in the following Web address: "H T T P colon slash slash . . . ").

In still another alternative embodiment, the configuration unit 704 could be configured to transmit a small software package across the link 741 that provides the receiver 718 with a compiled software package that can function across multiple communication devices (e.g., an Android, Windows Phone 7 or Symbian application package) such that the transmitted package would operate on the CPU 709 in the communication device 110 and essentially perform the steps carried out by the driver update 714.

The transmitted software package once executed by the CPU 709 would then locate the driver 712 over the communication network 121. For example, the transmitted software package could engage the Internet 123 to locate the data repository 134 and then locate the appropriate driver 712 for the headset 102. The configuration unit 704 and the receiver 718 could be configured to operate using the Bluetooth Object Exchange (OBEX) protocol, which supports file transfers between devices.

The software package transmitted by the configuration unit 704 over the link 741 could employ an anti-tampering mechanism, e.g., a digital signature, to provide assurance to the communication device 710 that the software package was genuine and had not been altered.

In yet another alternative embodiment, the configuration unit 704 may provide over the link 741 one or more small, compiled "stub" software packages known to work across multiple devices to the receiver 718. The receiver 718 may store the stub program in the data repository 754. When the stub program is first run by the CPU 709, the stub program could perform one of the following tasks:

A) instruct the driver update 714 to download and install software appropriate to the communication device 710, and/or B) if the communication device 710 did not have a driver update 714, then the stub program could automatically download and install software appropriate to the communication device 710.

In addition, the stub program could be configured to present a user interface on the communication device 710 that allows the user to download and install the appropriate driver and/or software from the data repository 134.

Figure 8:
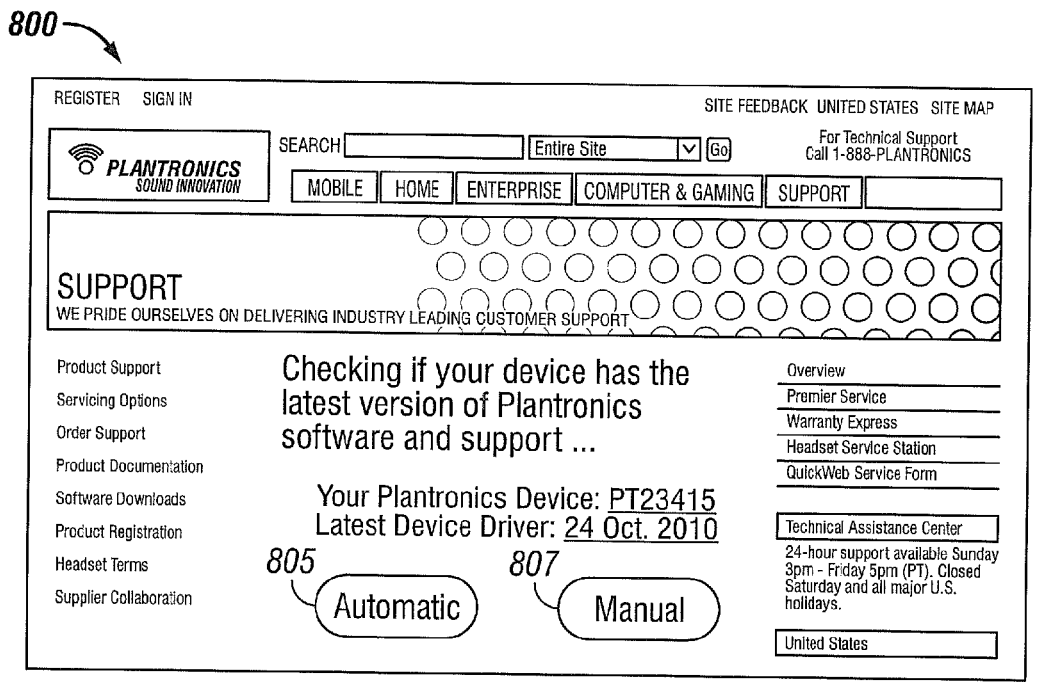
FIG. 8 illustrates a web page 800 that might be presented to a user as a part of locating the device driver 712 on the data repository 134, as shown in FIG. 7, according to an embodiment of the invention.

FIG. 8 illustrates a web page 800 that might be presented to a user as a part of locating the device driver 712 on the data repository 134, as shown in FIG. 7, according to an embodiment of the invention. As previously discussed, the user arrives at the page 800 based upon information provided by the headset 702, as shown in FIG. 7. The driver update 714 may be configured to operate in a manual and/or automatic mode, according to various embodiments of the invention.

The web page 800 may be configured to check the communication device 710 to determine what device driver the communication device 710 has for the headset 702 and whether there is a more recent update to this device driver. As shown in FIG. 8, the web page 800 identifies the device driver and provides the date for the most recently updated driver.

FIG. 8 shows an automatic update driver button 805 and a manual update driver button 807. If the user actuates the button 805, then the process of installing the appropriate device driver for the headset 702 will proceed automatically without requiring further intervention by the user. (If the driver update 714 has been set in an automatic mode, then the entire driver update procedure may proceed without user intervention, according to an embodiment of the invention.) If the user actuates the manual button 807, then the user may be allowed to guide and control certain portions of the installation process. For example, the user may have information that would lead him to believe that an earlier version of a given device driver might actually be more appropriate for the headset 702 than the driver selected automatically.

The process for installing device drivers over a remote communication link is fairly well known in the art, and the process displayed in FIG. 8 otherwise follows the conventional processes for selecting and installing a new device driver over a remote connection.

Figure 9:
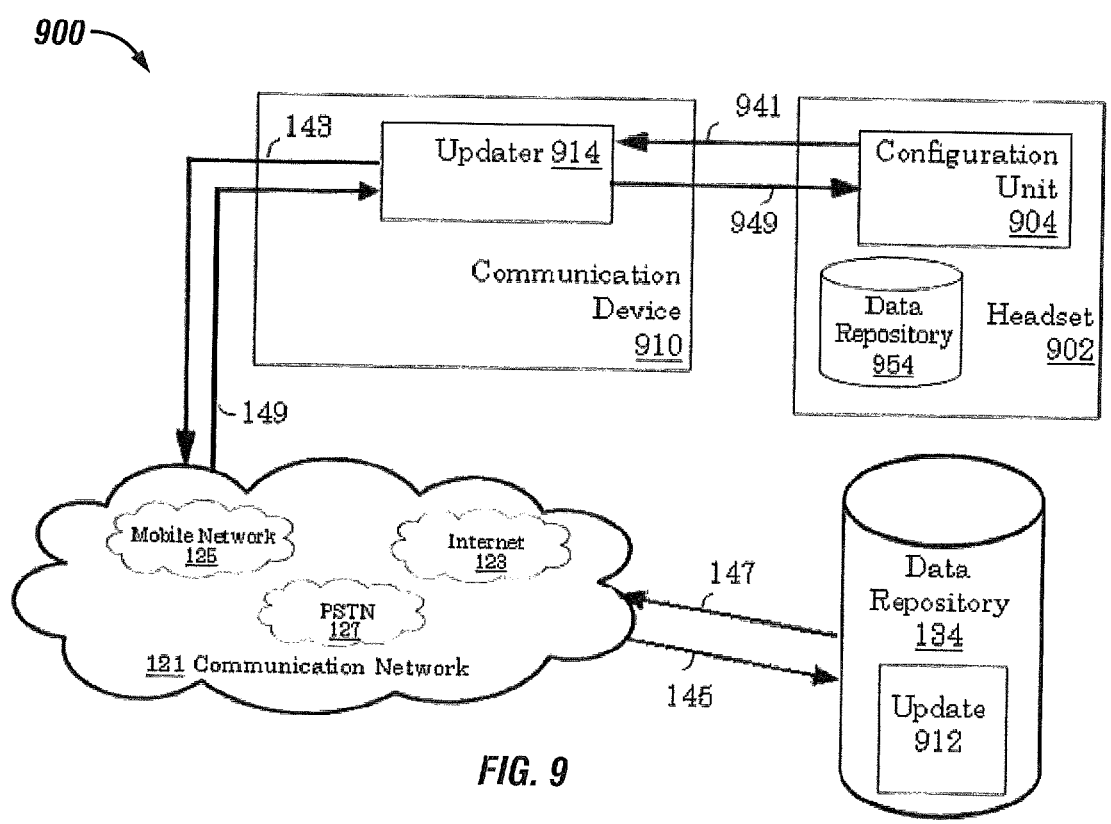
FIG. 9 illustrates a system 900 in which a headset 902 requests that a communication device 910 assist the headset 902 in the updating of its own memory system via a data repository 954, according to an embodiment of the invention.

FIG. 9 illustrates a system 900 in which a headset 902 requests that a communication device 910 assist the headset 902 in the updating of its system via a data repository 954, according to an embodiment of the invention. The headset 902 might include a memory unit, such as but not limited to non-volatile Flash memory (e.g., Flash memory), shown in FIG. 9, as the data repository 954.

The data stored in the data repository 954 may from time to time become out of date. For example, several months may pass between the manufacturing and shipping of the headset 902 and its purchase by a consumer. The configuration unit 904 may be configured to request that an updater unit 914 on the communication device 910 check with the data repository 134 to determine if an update 912 is available for the data stored in the data repository 954. The embodiment of the invention operates in a manner similar to the ones described in FIGS. 1, 3, 5, and 7, except that in this embodiment, once the updater 914 has received the update 912, it then forwards the update 912 via connection 949 to the configuration unit 904 for storage in the data repository 954 on the headset 902.

While specific embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

I claim:

1. A system for obtaining device data related to an audio device from a remote data repository, comprising:
    a configuration register on the audio device configured to send device identification information about the audio device to a computerized communication device, wherein the device identification information is sent by employing an Attention (AT) command modified based on a type of the audio device and wherein the AT command identifies a manufacturer and a model of the audio device;
    a command processor on the computerized communication device configured to receive the AT command having the device identification information sent by the configuration register and to re-format the device identification information in the AT command to configure an address identifying the device identification information using a registry on the computerized communication device having addressing information for a location of the remote data repository on a communication network, the address having a format suitable for transmission over the communication network to the remote data repository
    wherein the configuring of the address by the command processor comprises comparing the received device identification information with the addressing information on the registry to determine the address; and
    an update processor, comprising computer software operating on the computerized communication device, configured to transmit the address over the communication network to the remote data repository, wherein the remote data repository is configured to use the address to locate the device data related to the audio device and return the device data to the computerized communication device, and wherein the update processor is further configured to receive the device data from the remote data repository,
    wherein the computerized communication device applies the device data to operations between the audio device and the computerized communication device.

2. The system of claim 1, wherein the received device data comprises executable software and wherein applying the received device data by the computerized communication device comprises installing the received device data on the computerized communication device, the system further comprising:
    a central processing unit (CPU) that executes the installed device data on the computerized communication device, wherein the installed device data processes data related to operations between the computerized communication device and the audio device.

3. The system of claim 1, wherein the received device data comprises a device driver for the audio device and wherein applying the received device data comprises installing the received device data on the computerized communication device, the system further comprising:
    a central processing unit (CPU) configured to access the installed device data to control operations on the audio device by the computerized communication device.

4. The system of claim 1, wherein the received device data comprises an icon depiction of the audio device and wherein applying the received device data comprises installing the received device data on the computerized communication device, the system further comprising:
    a central processing unit (CPU) configured to display the icon on a display device associated with the computerized communication device when the computerized communication device is operably coupled with the audio device.

5. The system of claim 1 wherein the communication network is an internet, and wherein the remote data repository is located on a website, and wherein the format suitable for transmission over the communication network is a universal resource locator formatted address.

6. The system of claim 1, further comprising a central processing unit (CPU) on the computerized communication device, wherein re-formatting the received device identification information comprises calculating from the received device identification information the address having the format suitable for transmission over the communication network to the remote data repository.

7. The system of claim 6 wherein the communication network is an internet, and wherein the remote data repository is located on a website, and wherein the format suitable for transmission over the communication network is a universal resource locator formatted address.

8. The system of claim 1 wherein the audio device comprises a headset configured for Bluetooth communications with the computerized communication device.

9. The system of claim 1 wherein communications between the configuration register on the audio device and the command processor on the computerized communication device are formatted according to a Bluetooth protocol and wherein the Bluetooth protocol is a standard communication protocol in which the device identification information is encoded in a non-standard format by the configuration register.

10. The system of claim 9 wherein the configuration register encodes the communication using the non-standard format by employing the Attention command from the Bluetooth protocol in a non-standard format for the Attention command.

11. The system of claim 1 wherein the configuration register comprises a memory having a type of at least one of ROM, Flash, RAM or EPROM.

12. The system of claim 1 wherein the computerized communication device comprises a mobile telephone.

13. The system of claim 1 wherein the communication network comprises a mobile telephony network.

14. The system of claim 1, further comprising:
a data repository on the computerized communication device that has been configured to store device data received by the update processor.

15. The system of claim 14 wherein the command processor is further configured to examine the data repository using the device identification information to determine if the data repository already contains device data received from the remote data repository.

16. The system of claim 1 wherein the update processor is configured to periodically check the remote data repository to determine if it contains additional device data pertaining to the audio device.

17. The system of claim 1 wherein the update processor is configured to obtain user permission before accessing the remote data repository.

18. The system of claim 1 wherein the registry locates device information about the computerized communication device and the update processor transmits the device information to the remote data repository, which has been configured to use the device information and the address to locate the device data related to the audio device and return the device data to the computerized communication device.

19. A method for obtaining device data related to an audio device from a remote data repository, comprising:
sending device identification information to a computerized communication device from a configuration register on the audio device configured to send the device identification data by employing an Attention (AT) command modified based on a type of the audio device and wherein the AT command identifies a manufacturer and a model of the audio device;
receiving the device identification information in the AT command on the computerized communication device;
reformatting the received device identification information by the computerized communication device configured to process the AT command to configure an address identifying the device identification information using a registry on the computerized communication device having addressing information for a location of the remote data repository on a communication network, wherein the configuring of the address comprises comparing the received device identification information with the addressing information on the registry to determine the address having a format suitable for transmission over the communication network to the remote data repository;
transmitting the address under control of an update processor on the computerized communication device over the communication network to the remote data repository, wherein the remote data repository is configured to use the address to locate the device data and return the device data to the computerized communication device;
receiving the device data from the remote data repository by the update processor on the computerized communication device, and
applying, by the computerized communication device, the received device data to operations between the audio device and the computerized communication device.

20. The method of claim 19 wherein the received device data comprises executable software and wherein applying the received device data comprises installing the received device data on the computerized communication device, the method further comprising:
executing the installed device data on the computerized communication device, wherein the installed device data processes data related to operations between the computerized communication device and the audio device.

21. The method of claim 19, wherein the received device data comprises a device driver for the audio device and wherein applying the received device data comprises installing the received device data on the computerized communication device, the method further comprising:
accessing the installed device data by the computerized communication device to control operations on the audio device by the computerized communication device.

22. The method of claim 19, wherein the received device data comprises an icon depiction of the audio device and wherein applying the received device data comprises installing the received device data on the computerized communication device, the method further comprising:
displaying the icon on a display device associated with the computerized communication device when the computerized communication device is operably coupled with the audio device.

23. The method of claim 19 wherein the communication network is an internet, and wherein the remote data repository is located on a website, and wherein the format suitable for transmission over the communication network is a universal resource locator formatted address.

24. The method of claim 19, wherein the computerized communication device comprises a central processing unit (CPU) and wherein reformatting the received device identification information by the computerized communication device comprises:
calculating from the received device identification information the address having the format suitable for transmission over the communication network to the remote data repository.

25. The method of claim 24 wherein the communication network is an internet, and wherein the remote data repository is located on a website, and wherein the format suitable for transmission over the communication network is a universal resource locator formatted address.

26. The method of claim 19 wherein the audio device comprises a headset configured for Bluetooth communications with the computerized communication device.

27. The method of claim 19, further comprising:
formatting communications between the configuration register on the audio device and a command processor on the computerized communication device according to a Bluetooth protocol and wherein the Bluetooth protocol is a standard communication protocol he which the device identification information is encoded in a non-standard format by the configuration register.

28. The method of claim 17 wherein the configuration register comprises a memory having a type of at least one of ROM, Flash, RAM or EPROM.

29. The method of claim 27, further comprising:
encoding the communication by the configuration register preconfigured to employ in the non-standard format the Attention command from the Bluetooth protocol.

30. The method of claim 19 wherein the computerized communication device comprises a mobile telephone.

31. The method of claim 19 wherein the communication network comprises a mobile telephony network.

32. The method of claim 19, further comprising:
storing device data received by the update processor, comprising computer software operating on the computerized communication device, in a data repository on the computerized communication device.

33. The method of claim 19, further comprising:
a data repository on the computerized communication device using the device identification information by a command processor to determine if the data repository already contains the device data received from the remote data repository.

34. The method of claim 19, further comprising:
periodically checking the remote data repository by an update processor, comprising computer software operating on the computerized communication device, to determine if the remote data repository contains additional device data pertaining to the audio device.

35. The method of claim 19, further comprising:
obtaining user permission by an update processor, comprising computer software operating on the computerized communication device, before accessing the remote data repository.

36. The method of claim 19, further comprises:
locating device information about the computerized communication device by a registry on the computerized communication device having addressing information;
transmitting the device information to the remote data repository, wherein the remote data repository has been configured to use the device information and the address to locate device data related to the audio device and return the device data to the computerized communication device.

* * * * *